(12) United States Patent
Perrier et al.

(10) Patent No.: US 10,833,495 B2
(45) Date of Patent: Nov. 10, 2020

(54) MONOLITHIC ELECTRICAL CONNECTION HARNESS WITH ADAPTED RIGIDITY

(71) Applicant: LATELEC, Labege (FR)

(72) Inventors: Christophe Perrier, Toulouse (FR); Alexandre Simon, Toulouse (FR)

(73) Assignee: LateLEC, Labege (FR)

( * ) Notice: Subject to any disclaimer, the term of this patent is extended or adjusted under 35 U.S.C. 154(b) by 0 days.

(21) Appl. No.: 16/753,025

(22) PCT Filed: Oct. 2, 2018

(86) PCT No.: PCT/EP2018/076877
§ 371 (c)(1),
(2) Date: Apr. 2, 2020

(87) PCT Pub. No.: WO2019/068743
PCT Pub. Date: Apr. 11, 2019

(65) Prior Publication Data
US 2020/0235555 A1 Jul. 23, 2020

(30) Foreign Application Priority Data

Oct. 5, 2017 (FR) ..................................... 17 59324

(51) Int. Cl.
*H02G 3/04* (2006.01)
*B64D 47/00* (2006.01)
(52) U.S. Cl.
CPC ........... *H02G 3/0406* (2013.01); *B64D 47/00* (2013.01); *H02G 3/0481* (2013.01); *B64D 2221/00* (2013.01)

(58) Field of Classification Search
CPC ............... H02G 3/0406; H02G 3/0481; B64D 2221/00; B64D 47/00
(Continued)

(56) References Cited

U.S. PATENT DOCUMENTS 7,135,790 B2 11/2006 Fondriest
2013/0248246 A1 9/2013 Oga
(Continued)

FOREIGN PATENT DOCUMENTS

FR 2779800 12/1999
JP 2008226587 9/2008
(Continued)

*Primary Examiner* — Sherman Ng
(74) *Attorney, Agent, or Firm* — Defillo & Associates, Inc.; Evelyn A. Defillo

(57) ABSTRACT

The invention relates to a monolithic electrical connection harness (1) having an adapted rigidity traveling along a determined path, including a flexible insulating casing (2a to 2c) inserting shielded electrical connection cables (C1 to C3) to constitute a bundle (F1 to F3), devices (S1 to S3) for holding the ends (Z1 to Z3) of the flexible casing (2a to 2c) on rear connections (R1 to R3) integrating the end zones (E1 to E3) of the cables (C1 to C3) In this harness (1), a reinforcing sheath (6) surrounds the cable bundle (F1 to F3) and is made up of one or more layers (61 to 63) of composite material made from a flexible matrix in polymer material in which a ply of fibers for reinforcing in robustness and/or stiffness is draped along the cable bundle (F1 to F3), the reinforcing fibers being assembled in each ply in a shape chosen from between a unidirectional web, a multidirectional web and a fabric of wires formed from braided fibers.

16 Claims, 2 Drawing Sheets

(58) Field of Classification Search
USPC .................................................... 174/72 A
See application file for complete search history.

(56) References Cited

U.S. PATENT DOCUMENTS

2014/0076628 A1* 3/2014 McGrath .............. H01B 7/0045
                                                                         174/84 R
2014/0087171 A1* 3/2014 Kasl ...................... C22C 47/068
                                                                         428/222

FOREIGN PATENT DOCUMENTS

| | | |
|---|---|---|
| JP | 20100045900 | 2/2010 |
| JP | 20121714776 | 9/2012 |
| JP | 2015088397 | 5/2015 |
| WO | WO2012/091174 | 7/2012 |
| WO | WO2014/009231 | 1/2014 |
| WO | WO2014070851 | 5/2014 |

* cited by examiner

MONOLITHIC ELECTRICAL CONNECTION HARNESS WITH ADAPTED RIGIDITY

CROSS REFERENCE TO RELATED APPLICATION

This application is a national stage entry of PCT/EP2018/076877 filed Oct. 2, 2018, under the International Convention claiming priority over French Patent Application No. FR1759324 filed Oct. 5, 2017.

TECHNICAL FIELD

The invention relates to a monolithic electrical connection harness having an adapted rigidity, such a harness being usable in severe environmental conditions, in particular for forming the electrical connections of aircraft systems, for example landing gear actuators. The invention also relates to a method for producing a harness equipped with specific rear fittings.

BACKGROUND OF THE INVENTION

The general field of the invention is the protection of electrical cables intended to be subjected to high stresses, whether mechanical, thermal or hygrometric, while ensuring EMI shielding (protection against electromagnetic interference). Conventionally, the protective function of the harness made up of these cables is ensured by a harness made up of an assembly of flexible conduits (hereinafter referred to as sheaths) and rigid conduits, coupled together by transition fittings, where they are secured to one another (by welding, screwing, adhesive bonding, etc.). Fittings for branching (primary, secondary, etc.) use transition components to couple, also by connection, a main sheath to electrical supply sheaths for control members of various pieces of equipment of a given autonomous functional entity (robot, vehicle, machine tool, etc.).

At the ends of this protective assembly, specific rear fittings (or "backshells") take over the shielding of the conduits by overbraiding, and the shielding of the cables by grounding braids. The protective sheaths and conduits are thus composed of successive links, each having a specific rigidity.

In the case of an aircraft, the control members are distributed in various systems (actuators of the landing gear; compressors of the air conditioning system; pumps of the engine kerosene supply system; pumps of the hydraulic circuits of the pressurization system; defrosting and ventilation actuators; cabin system equipment, etc.).

The current solutions require a specific rigidity for each component of the harness protection assembly and a large number of components, whereas the paths allocated for the wiring harnesses are generally increasingly reduced. For example, in the case of an aircraft, these paths are located along a structural frame generally made of composite, mounted on the aircraft skin, itself made of composite. These solutions thus entail a significant weight to achieve the protection function and a large number of references to be managed.

A modular electric harness for the landing gear of a jet aircraft is known, for example, from U.S. Pat. No. 7,135,790. This modular wiring system comprises a main sub-assembly connecting the fuselage to the other sub-assemblies, this main sub-assembly having a connection to the fuselage and two connections forming a "Y" junction at a distal end. These connections connect the main sub-assembly to a weight-off-wheels sub-assembly and to a brake temperature monitoring sub-assembly. The latter sub-assembly is connected to an anti-skid sub-assembly. The sub-assemblies form a rigid tubular structure covered with abrasion resistant sleeves.

Another document, FR 2 779 800, provides for the installation of a protective sheath for cables that is impact-resistant, flexible and leaktight. This sheath is composed of independent tubular elements fitted together so as to allow adaptation of the configuration by axial movement or pivoting of elements relative to other elements. Each element comprises two segments, a first segment having an annular groove and a second segment having an annular bead for snap-fitting in the groove of an adjacent element. Such adaptation is very limited and does not guarantee protection under severe operating conditions.

In US 2013248246, the wiring harness comprises a first central segment for power transmission, connected at the ends to two secondary segments via connection portions. The first power transmission segment has a rigidity allowing it to autonomously retain its shape after being bent from a state of straight extension, while the secondary segments have a high flexibility such that they can be easily bent and maintained thus by fixing flanges. The first segment comprises conductors made of aluminum or aluminum alloy of circular or rectangular section, covered with an insulation, a common shielding layer and an extrusion-molded sheath. The secondary segments consist of twisted-wire conductors covered with an insulation, a common EMI shielding sheath which is free (not molded) and, optionally, a corrugated insulating tube.

Such a solution does not make it possible to constitute a monolithic harness which does not have an intermediate connector between segments of different rigidity, and which is therefore capable of being used in severe environmental conditions.

SUMMARY OF THE INVENTION

The invention aims to overcome the drawbacks of the prior art, and aims in particular to reduce the number of components constituting the harness, with the corresponding number of references to be managed, to reduce the weight of the means dedicated to the protection of the harness while allowing use in severe environmental conditions generating high stresses.

To this end, the invention proposes adapting the rigidity of the protection of the harness to the level of stress in the environment by using a matrix of flexible protective material, like that used for elastomeric seals, all along the harness and by stiffening the matrix by laying up reinforcements adapted to the desired function (robustness, rigidity, type of protection).

More specifically, the present invention relates to a monolithic electrical connection harness having an adapted rigidity following a predetermined path. Such a harness includes a flexible insulating jacket with the insertion of shielded electrical connection cables to form a bundle, holding means for holding the ends of said flexible jacket on rear fittings incorporating end zones of the cables. In this harness, a reinforcing sheath surrounds the bundle of cables and is composed of a composite made up of a flexible polymer matrix and one or more layers made up of a ply of reinforcing fibers for reinforcement in terms of robustness and/or stiffness, laid along the bundle of cables. Moreover, the reinforcing fibers are assembled in each ply in a form selected between a unidirectional sheet, a multidirectional sheet and a fabric of threads formed of braided fibers.

Under these conditions, the harness is said to be "monolithic" in that it takes the form of a single, substantially homogeneous part which incorporates a reinforcing sheath adapted to the rigidity required in the various areas of the harness. This adaptation to the needs and stresses in these areas (impact strength, erosion resistance, robustness, stiffness, fire protection, etc.) is achieved by the number of layers of fibers, the type and the assembly of fibers used in the or each layer. This harness also has the advantage of being easily interchangeable and of being quickly replaced, in other words of being considered a line replaceable unit (LRU).

According to preferred embodiments:

the bundle of cables for electrical connection incorporates a metal sheath for EMI shielding of said cables, this metal sheath being inserted under the flexible jacket of the bundle of cables, with the possibility of adhering to this jacket, and connected to said rear fittings;

the metal EMI shielding sheath has a slippery face on the side facing the cables;

the matrix consists of a polymer material selected from a rubber (natural or synthetic), a thermoplastic elastomer, a silicone, a fluoro-silicone and a polyethylene-propylene;

the reinforcing fibers for reinforcement in terms of robustness are selected from glass fibers, aramid fibers, bamboo fibers or more generally vegetable fibers, and basalt fibers, the reinforcing fibers for stiffening reinforcement preferably being carbon fibers, silicon carbide fibers or equivalent;

at least one reinforcing insert is integrated in the reinforcing sheath between two layers of composite;

the reinforcing insert is made of a material selected from a thermoplastic material, a metal alloy and a composite;

a non-stick film is placed between the bundle of cables and the reinforcing sheath in order to prevent the matrix of the sheath from sticking to said bundle;

the non-stick film is a film made of a material selected from a material made of thermoplastic, Teflon and polyester;

a layer of anti-corrosion composite forms an external covering of the reinforcing sheath;

the reinforcing sheath comprises at least one layer of composite incorporating, starting from the bundle of cables, a fabric of aramid fibers for reinforcement in terms of robustness, a carbon fabric for stiffness reinforcement and/or an anti-corrosion glass fiber fabric;

the holding means consist of clamping collars.

The invention also relates to a method for producing a harness between two specific rear fittings, in particular the harness defined above. This method includes the following main steps:

positioning the cable end zones in rear fittings while holding the ends of a flexible jacket, which encloses the cables, on the fittings;

surrounding the bundle of cables with a polymer matrix similar to a composite matrix;

laying up the matrix by impregnation of one or more layers made up of a ply of reinforcing fibers for reinforcement in terms of robustness and/or stiffness, along the bundle of cables to form a reinforcing sheath, the reinforcing fibers being assembled in each ply in a form selected between a unidirectional sheet, a multidirectional sheet and a fabric of threads formed of braided fibers;

overmolding by curing of the harness and crosslinking of the polymers of the reinforcing sheath, and positioning the harness in the required configuration and connecting the rear fittings.

Advantageously, the following additional steps may be followed:

repeating the laying up with other types of fibers to form other reinforcing layers, all of these layers forming the reinforcing sheath;

before positioning the flexible jacket, arranging a metal EMI shielding sheath on the cables and connecting this EMI shielding sheath to the rear fittings;

arranging a non-stick film on the flexible jacket of the bundle of cables in order to prevent the reinforcing sheath from sticking to said bundle;

Forming and installing at least one annular insert between two layers of the reinforcing sheath.

DESCRIPTION OF THE FIGURES

Further aspects and details of the implementation of the invention will emerge on reading the following detailed description, accompanied by attached drawings which show.

DETAILED DESCRIPTION

Identical reference signs or reference signs with a common root, used in the various figures, relate to the same identical element. The term "longitudinal" describes elements extending in main direction or dimension.

Figure 1:
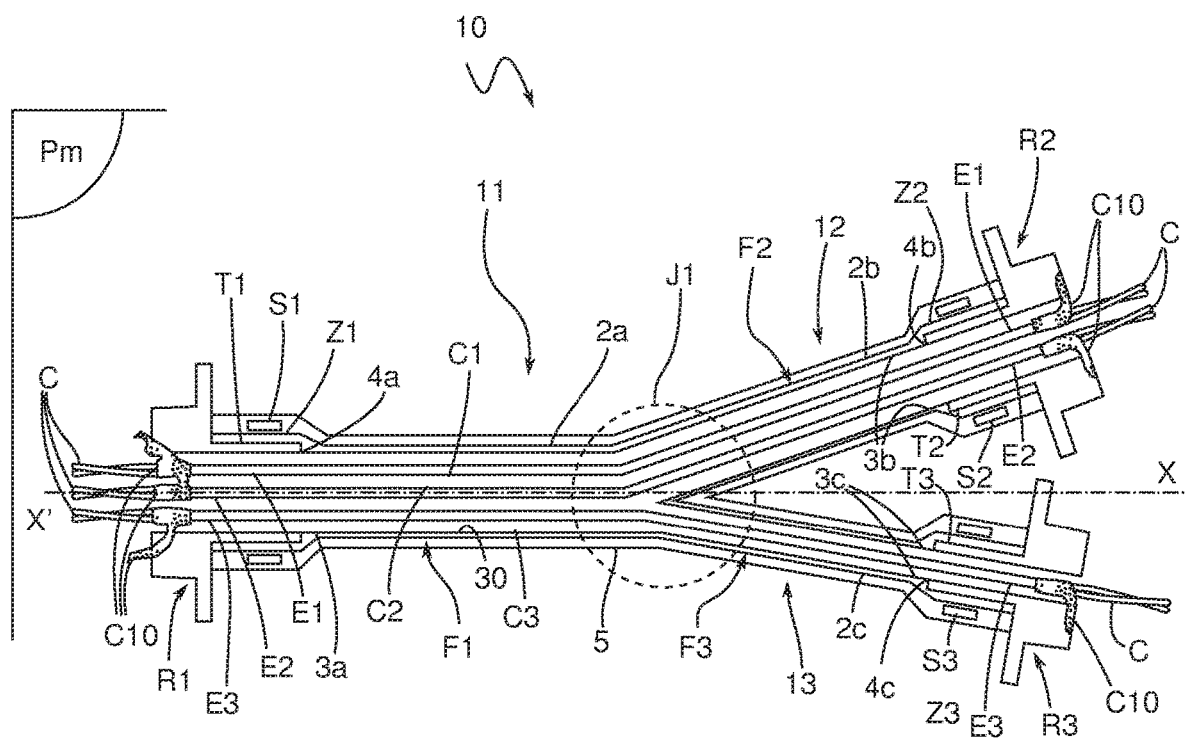
in FIG. 1, a longitudinal sectional view of an example of a basic harness structure with a "Y" junction and rear fittings at the ends.

Referring to the longitudinal section in FIG. 1, this shows the basic structure 10 of an electrical connection harness in a median plane "Pm", this harness being intended to be fitted to the electrical architecture of an aircraft. Such a basic structure 10 extends longitudinally along the axis X'X in a main segment 11 and has a "Y" junction J1 which splits this main segment 11 into two secondary segments 12 and 13. Said base structure 10 comprises a bundle F1 incorporating shielded electrical connection cables C1 to C3 enclosed in a jacket made of flexible insulating thermoplastic material 2a. The ends of shielding socks C10 of the cables C1 to C3 connect from rear fittings R1 to R3. The same cables without their shielding "C" also appear outside the shielding socks C10.

In the secondary segments 11 and 12, the bundle F1 splits into two secondary bundles F2 and F3 at the junction J1. The bundle F2 carries the cables C1 and C2 and the bundle F3 carries the cable C3, these secondary bundles F2 and F3 being enclosed in extensions 2b and 2c, respectively, of said jacket 2a.

The rear fittings R1 to R3 incorporate end zones E1 to E3 of said cables C1 to C3. At these fittings R1 to R3, clamping collars S1 to S3 respectively clamp and secure end zones Z1 to Z3 of said jacket 2a and its extensions 2b, 2c around tubular portions T1 to T3 of the fittings R1 to R3.

In this basic harness structure 10, a metal sheath for EMI shielding 3a of the cables C1 to C3, along with its extensions 3b, 3c, are advantageously inserted under the flexible insulating jacket 2a and under its extensions 2b, 2c, respectively. This metal EMI shielding sheath 3a and its extensions 3b, 3c, in this example, adhere to said flexible jacket 2a and to its extensions 2b, 2c, respectively, and have, on their face 30 facing the cables C1 to C3, a slippery coating. Said metal shielding sheath 3*a* and its extensions 3*b*, 3*c* are respectively connected at their ends 4*a* to 4*c* to the tubular portions T1 to T3 of said rear fittings R1 to R3.

Figure 2:
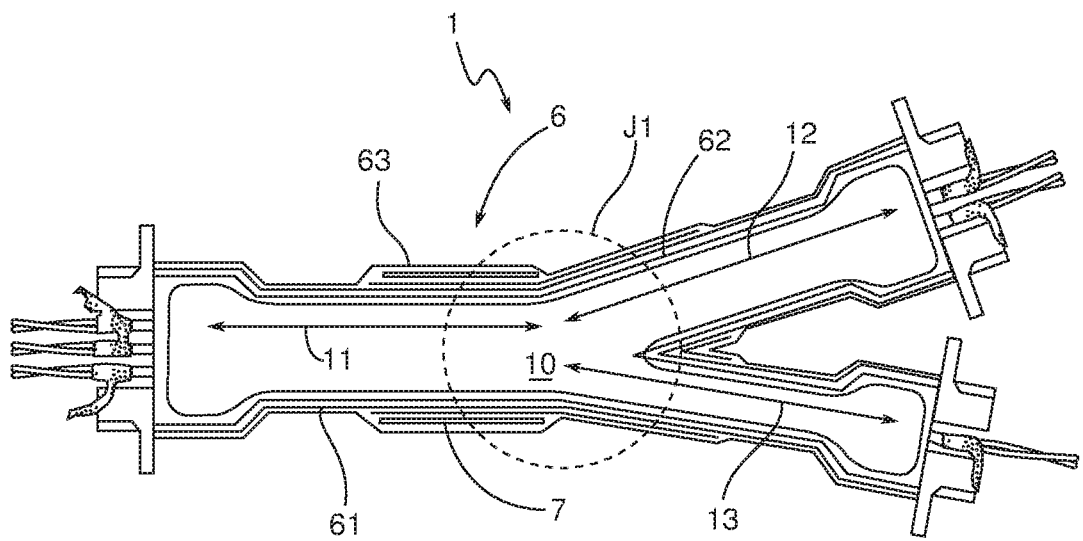
in FIG. 2, a sectional view of the example of a harness according to FIG. 1 with a protective sheath according to the invention, and in FIG. 3, a longitudinal sectional view of the example of a harness according to the invention after curing.

Advantageously, a non-stick thermoplastic film 5 is placed on the flexible insulating jacket 2*a* and its extensions 2*b*, 2*c*, in order to prevent a reinforcing sheath 6, like that put in place with reference to FIG. 2, from sticking. The reinforcing sheath 6 thus surrounds the base structure 10 externally to form the harness 1. This reinforcing sheath 6 is successively composed, in the example, of three superimposed composite layers 61 to 63, formed of a flexible matrix made of synthetic rubber elastomer—conventionally used to produce seals suitable for aircraft doors in this example—and plies of reinforcing fibers in the form of fabrics of braided fiber threads, the fabrics being laid in the matrix along the bundles of cables F1 to F3 (see FIG. 1).

The harness 1 being more particularly intended to be inserted in an area where anti-corrosion constraints and stiffness and robustness requirements are more particularly to be met, the composite layers 61 to 63 incorporate, respectively: a fabric of aramid fibers for reinforcement of the matrix in terms of robustness, a carbon fabric for reinforcement of the matrix in terms of stiffness—the corresponding reinforcing layer 62 being located around the junction J1—and an anti-corrosion glass fiber fabric. Alternatively, the plies may consist of unidirectional or multidirectional sheets of fibers depending on the requirements in terms of anti-corrosion, stiffness and robustness.

Moreover, a reinforcing insert 7 is advantageously integrated between the stiffening reinforcement composite layer 62 and the anti-corrosion composite layer 63. This insert 7 may consist of a composite, as in this example in which it consists of a ring of ceramic matrix and a multidirectional sheet of carbon fibers. Alternatively, the reinforcing insert may consist of a metal ring, for example made of aluminum or titanium alloy. Such an insert in this case makes it possible to reinforce the mechanical strength of the main segment 11 of the harness 1 just before the "Y" junction J1 which extends this main segment 11 as the two secondary segments 12 and 13.

The invention also relates to a method for producing an electrical connection harness, in particular, but not exclusively, the harness 1 described above. Such a method involves, in a first step, positioning the cable end zones in rear fittings, while holding, on these fittings, the ends of a flexible jacket enclosing the cables. Advantageously, before positioning the ends of the flexible jacket, a metal EMI shielding sheath, such as the sheaths 3*a* to 3*c* (see FIG. 1), may be installed on the cables and this EMI shielding sheath is connected to the rear fittings. In the example of FIG. 1, clamping collars S1 to S3 respectively clamp end zones Z1 to Z3 of the flexible jacket 2*a* and its extensions 2*b*, 2*c* around tubular portions T1 to T3 of the fittings R1 to R3. The EMI shielding sheath 3*a* integrated in the bundle of cables F1 is extended by the EMI shielding sheaths 3*b* and 3*c* in the bundles F2 and F3.

Advantageously, a non-stick film 5 may be installed on the flexible jacket 2*a* of the bundle of cables F1 in order to prevent the matrix deposited in the next step from sticking.

The method continues by surrounding the bundle of cables with a flexible matrix similar to a composite matrix. In the example described above, the matrix is made of an elastomer material, more precisely of a synthetic rubber elastomer, surrounding the bundles F1 to F3 of cables C1 to C3 (see FIG. 1).

In a manner similar to the production of a composite, the matrix is laid up by impregnation of a ply of reinforcing fibers along the bundle of cables to form at least one reinforcing layer, like the layers 61 to 63 in the example described above. Advantageously, this laying up is repeated with other types of fibers to form other reinforcing layers, the layer or all of these layers forming a reinforcing sheath 6. In the example of FIG. 2, the reinforcing sheath 6 consists of the three reinforcing layers 61 to 63. The fibers are in the form of a unidirectional or multidirectional sheet, a pre-woven sheet or even a sheet pre-impregnated with polymer material forming the matrix.

Advantageously, at least one annular insert may be formed and installed between two layers of the reinforcing sheath 6. In the example of FIG. 2, the annular insert 7 is installed between the stiffening reinforcement composite layer 62 and the anti-corrosion composite layer 63.

Figure 3:
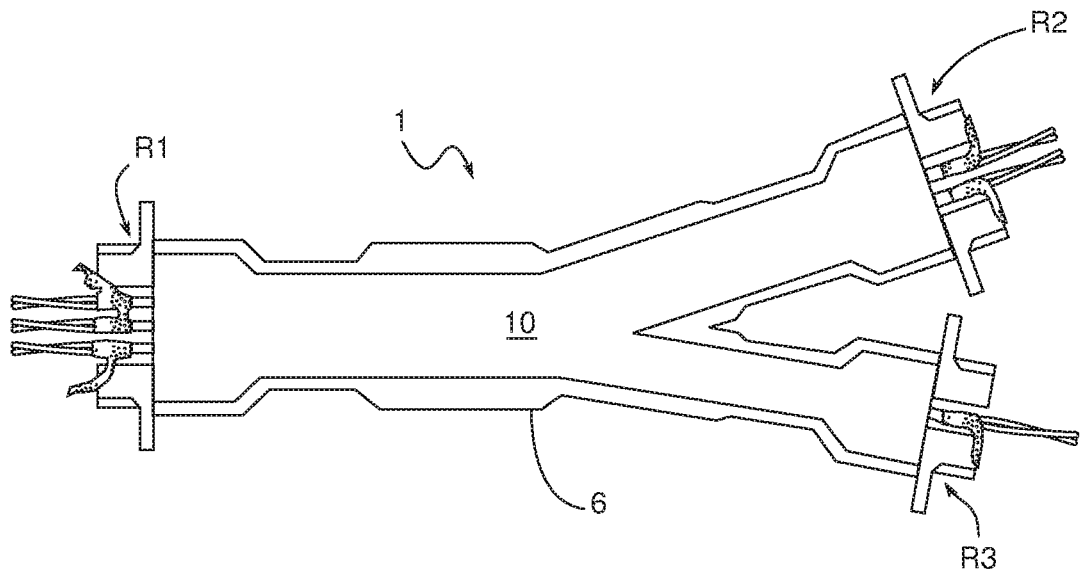

The next step consists in overmolding by curing of the harness and crosslinking of the reinforcing sheath. With reference to FIG. 3, this crosslinking concerns all of the reinforcing layers, which fuse around the basic harness structure 10 to form the reinforcing sheath 6. This curing may be carried out under a heat press, with a pressure of a few bar, or in an oven, or indeed under vacuum, at the crosslinking temperature adapted to the matrix.

Lastly, the harness 1 is positioned along the path provided in the electrical architecture and the rear fittings R1 to R3 are connected. In the exemplary embodiment, the harness 1 is positioned in the environment provided by the electrical architecture of the aircraft and the fittings R1 to R3 are connected at the end to the electrical control units of the equipment provided.

The invention is not limited to the embodiments described or shown. It is for example possible to provide intermediate connectors. Furthermore, the attachment to the fittings may be achieved by any known means: screwing, riveting, clamping, welding, brazing or any equivalent means. Moreover, the fibers assembled in a multidirectional sheet may be distributed "loose" in the sheet. Furthermore, the thickness of the composite layers may vary so as to be tailored to their own reinforcement function. Other types of fiber may also be used: ceramic, Kevlar®, carbon, bamboo, basalt, glass, etc. fibers.

The invention claimed is:

1. A monolithic electrical connection harness (1) having an adapted rigidity following a predetermined path, including a flexible insulating jacket (2*a* to 2*c*) with the insertion of shielded electrical connection cables (C1 to C3) to form a bundle (F1 to F3), holding devices (S1 to S3) for holding the ends (Z1 to Z3) of said flexible jacket (2*a* to 2*c*) on rear fittings (R1 to R3) incorporating end zones (E1 to E3) of the cables (C1 to C3), and the monolithic electrical connection harness comprising a reinforcing sheath (6) surrounds the bundle (F1 to F3) of cables and is composed of a composite made up of a flexible polymer matrix and one or more layers (61 to 63) made up of a ply of reinforcing fibers for reinforcement in terms of robustness and/or stiffness, laid along the bundle (F1 to F3) of cables, the reinforcing fibers being assembled in each ply in a form selected between a unidirectional sheet, a multidirectional sheet and a fabric of threads formed of braided fibers.

2. The connection harness according to claim 1, wherein the bundle (F1 to F3) of cables for electrical connection (C1 to C3) incorporates a metal sheath for EMI shielding (3*a* to 3*c*) of said cables (C1 to C3), this metal sheath (3*a* to 3*c*) being inserted under the flexible jacket (2*a* to 2*c*) of the bundle of cables (F1 to F3) and connected to said rear fittings (R1 to R3).

3. The connection harness according to claim 1, wherein the metal EMI shielding sheath (3a to 3c) has a slippery face (30) on the side facing the cables (C1 to C3).

4. The connection harness according to claim 1, wherein the matrix includes a polymer material selected from a rubber (natural or synthetic), a thermoplastic elastomer, a silicone, a fluoro-silicone, or a polyethylene-propylene.

5. The connection harness according to claim 1, wherein the reinforcing fibers are selected from glass fibers, carbon fibers, aramid fibers, bamboo fibers and basalt fibers.

6. The connection harness according to claim 1, wherein at least one reinforcing insert (7) is integrated in the reinforcing sheath (6) between two layers of composite (61 to 63).

7. The connection harness according to claim 1, wherein the reinforcing insert (7) is made of a material selected from a thermoplastic material, a metal alloy, or a composite.

8. The connection harness according to claim 1, wherein a non-stick film (5) is placed between the bundle (F1 to F3) of cables and the reinforcing sheath (6) in order to prevent the reinforcing sheath (6) from sticking to said bundle (F1 to F3).

9. The connection harness according to claim 1, wherein the non-stick film (5) is a film made of a material selected from a material made of thermoplastic, Teflon®, or and polyester.

10. The connection harness according to claim 1, wherein a layer of anti-corrosion composite (63) forms an external covering of the reinforcing sheath (6).

11. The connection harness according to claim 1, wherein the reinforcing sheath (6) comprises at least one layer (61 to 63) of composite incorporating, starting from the bundle (F1 to F3) of cables, a fabric of aramid fibers for reinforcement in terms of robustness, a carbon fabric for stiffness reinforcement and/or an anti-corrosion glass fiber fabric.

12. A method for producing a harness between two specific rear fittings, the method including the steps of:

positioning the cable (C1 to C3) end zones (E1 to E3) in rear fittings (R1 to R3) while holding the ends (Z1 to Z3) of a flexible jacket (2a to 2c), which encloses the cables (C1 to C3), on the fittings (R1 to R3);

surrounding the bundle (F1 to F3) of cables with a polymer matrix similar to a composite matrix;

laying up the matrix by impregnation of one or more layers (61 to 63) made up of a ply of reinforcing fibers for reinforcement in terms of robustness and/or stiffness, along the bundle (F1 to F3) of cables to form a reinforcing sheath (6), the reinforcing fibers being assembled in each ply in a form selected between a unidirectional sheet, a multidirectional sheet and a fabric of threads formed of braided fibers;

overmolding by curing of the harness (1) and crosslinking of the polymers of the reinforcing sheath (6), and positioning the harness (1) in the required configuration and connecting the rear fittings (R1 to R3).

13. The production method according to claim 12, wherein the laying up is repeated with other types of fibers to form other reinforcing layers (61 to 63), all of these layers (61 to 63) forming the reinforcing sheath (6).

14. The assembly method according to claim 12, wherein, before positioning the flexible jacket (2a to 2c), a metal EMI shielding sheath (3a to 3c) is arranged on the cables (C1 to C3) and this EMI shielding sheath (3a to 3c) is connected to the rear fittings (R1 to R3).

15. The assembly method according to claim 12, wherein a non-stick film (5) is arranged on the flexible jacket (2a to 2c) of the bundle (F1 to F3) of cables in order to prevent the reinforcing sheath (6) from sticking to said bundle (F1 to F3).

16. The assembly method according to claim 13, wherein at least one annular insert (7) is formed and installed between two layers (61 to 63) of the reinforcing sheath (6).

* * * * *